United States Patent [19]
Mullen

[11] Patent Number: 5,872,539
[45] Date of Patent: Feb. 16, 1999

[54] METHOD AND SYSTEM FOR PROVIDING A USER WITH PRECISION LOCATION INFORMATION

[75] Inventor: Robert Mullen, Woodland Hills, Calif.

[73] Assignee: Hughes Electronics Corporation, Los Angeles, Calif.

[21] Appl. No.: 655,068

[22] Filed: May 29, 1996

[51] Int. Cl.[6] .............................. H04B 7/185; G01S 5/02
[52] U.S. Cl. ...................... 342/357; 342/457; 364/449.7
[58] Field of Search ................................... 342/352, 357, 342/457; 455/12.1; 364/449.7

[56] References Cited

U.S. PATENT DOCUMENTS

| | | | |
|---|---|---|---|
| 4,894,655 | 1/1990 | Joguet et al. ........................... | 340/988 |
| 5,223,844 | 6/1993 | Mansell et al. ......................... | 342/357 |
| 5,379,045 | 1/1995 | Gilbert et al. .......................... | 342/357 |
| 5,587,715 | 12/1996 | Lewis .................................... | 342/357 |

OTHER PUBLICATIONS

P.K. Eng, The Global Postioning System: Signals, Measurements and Performance, Int'l J. of Wireless Info. Ntwrks., vol. 1, No. 2, 1994, pp. 83–105.

*Primary Examiner*—Thomas H. Tarcza
*Assistant Examiner*—Dao L. Phan
*Attorney, Agent, or Firm*—Georgann S. Grunebach; Michael W. Sales; Wanda K. Denson-Low

[57] ABSTRACT

A method and system for providing a user with correction information for use in accurately determining the location of the user. A plurality of monitor stations are disposed at a plurality of known fixed locations for monitoring a plurality of navigation data messages transmitted by Global Positioning Systems (GPS) Space Vehicles (SVs) and for determining a plurality of corresponding correction factors. A central ground station is operatively coupled to each of the plurality of monitor stations for receiving the plurality of correction factors from each of the plurality of monitor stations. A GPS transceiver receives at least one of the plurality of navigation data messages at an unknown location and determines a general location of the user. The general location of the user is then transmitted to the central ground station. The central ground station determines user location correction data based on the navigation data received by the user and the plurality of correction factors transmitted by each of the plurality of monitor stations. The central ground station then transmits the user location correction data to the user for use in determining the location of the user with sub-meter precision. An accounting record may be created for the user for receiving the precision correction information so that the user can be subsequently billed a fee for the services provided by the central ground station.

23 Claims, 2 Drawing Sheets

METHOD AND SYSTEM FOR PROVIDING A USER WITH PRECISION LOCATION INFORMATION

TECHNICAL FIELD

This invention relates to a Global Positioning System (GPS) and, more particularly, to a method and system for providing a user with precision location information utilizing the GPS for use in accurately determining the location of the user.

BACKGROUND ART

The United States Department of Defense created the Global Positioning System (GPS) to allow military ships, aircraft and ground vehicles to determine their location anywhere in the world. GPS consists of a satellite segment, a ground control segment, and user receivers. The satellite segment consists of 24 satellites placed asymmetrically in six orbital planes where each plane is inclined by 55° relative to the equatorial plane. Each satellite continuously broadcasts direct-sequence, spread-spectrum signals on which passive receivers can perform precise ranging measurements. Each broadcast is also modulated with a navigation data message, which is developed by the ground control station and provides data to the user such as the satellite location and clock error. For each of several satellites, the user equipment measures a "pseudo range" and demodulates the navigation message. The pseudo range is equal to the true range from the receiver to the satellite plus errors, either intentionally or unintentionally, introduced in the range measurement. Pseudo range measurements to four well-spaced satellites are sufficient to solve for the user's three-dimensional position and clock offset.

GPS includes the standard positioning service (SPS) which provides civilian users with 100 meter accuracy. Civilian users are guaranteed access to a 1.023 MHz spreading code (the C/A code) which modulates a signal at a frequency of 1575.42 MHz. Errors are introduced, however, due to several slowly varying biases arising from ionospheric refraction, tropospheric refraction, stability of the satellite clock, predictability of the orbit of the satellite, stability of the receiver, direct sequence tracking, and selective availability. Selective availability is the largest error source and is intentionally introduced by the Department of Defense for national security reasons. With selective availability enabled, the SPS provides 100 meter horizontal accuracy. Additional information regarding GPS can be found in "The Global Positioning System: Signals, Measurements, and Performance" by Per K. Enge, INTERNATIONAL JOURNAL OF WIRELESS INFORMATION NETWORKS, Volume 1, No. 2, 1994.

Another approach to providing precision navigation involves the use of the Wide Area Augmentation System (WAAS) utilized by the Federal Aviation Agency (FAA) and available to the general public. The WAAS system improves the integrity, accuracy, availability and continuity of the GPS Standard Positioning Service (SPS). The WAAS system includes a terrestrial network of stations (wide area reference stations) monitoring the performance of GPS satellites, and a WAAS geostationary satellite. The reference stations continuously report to regionalist master stations (wide area master stations). The master stations process the observed data to determine SPS signal corrections and whether a system performance fault has occurred. The SPS signal corrections and a system performance fault, if any, is up-linked to a geostationary satellite via a command antenna (ground earth station) for immediate rebroadcast by the satellite to users using the WAAS service.

The WAAS system provides correction data to all users that have a WAAS receiver. The WAAS system, however, fails to provide a user with precise location information since all users throughout the Continental United States receive the same SPS correction signals. Furthermore, this system does not have a way to create an accounting record so the user can be subsequently charged for receiving the correction data. In addition, there is a delay in providing the user with signal integrity since a system fault has to first be determined by the master stations and then transmitted to the geostationary satellite before it is broadcasted to the user.

DISCLOSURE OF THE INVENTION

It is thus a general object of the present invention to provide a method and system for providing a user with precision correction information for use in accurately determining the location of the user.

It is another object of the present invention to provide a method and system for creating an accounting record for a user receiving precision information in determining the location of the user.

In carrying out the above objects and other objects, features and advantages, of the present invention, a method is provided for providing a user with precision correction information so the user can accurately determine the location of the user. The method includes the steps of receiving at least one of a plurality of navigation data messages, including position estimates and navigation data, at an unknown location and determining a general location of the user based on the at least one of a plurality of navigation data messages. The method further includes the step of transmitting a user data message including data corresponding to the general location of the user to a central ground station. Still further, the method includes the step determining user location correction data based on the user data message and a plurality of correction factors transmitted by a plurality of monitor stations disposed at known fixed locations. The method concludes the step of transmitting the user location correction data to the user for use in determining the location of the user with sub-meter precision.

In further carrying out the above objects and other objects, features and advantages, of the present invention, a system is also provided for carrying out the steps of the above described method. The system includes a plurality of monitor stations disposed at a plurality of known fixed locations for monitoring the navigation data messages transmitted by the GPS and for determining a plurality of corresponding correction factors. The system also includes a central ground station operatively coupled to each of the plurality of monitor stations for receiving the plurality of correction factors from each of the plurality of monitor stations and for determining an integrity of the navigation data messages. Still further, the system includes a first transceiver for receiving at least one of the plurality of navigation data messages at an unknown location and determining a general location of the user accordingly and for generating a corresponding user data message. The system also includes a second transceiver for transmitting the user data message to the central ground station. The central ground station determines user location correction data based on the user data message and the plurality of correction factors transmitted by each of the plurality of monitor stations. The central ground station further transmits the user location correction data to the user for use in determining the location of the user with sub-meter precision.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
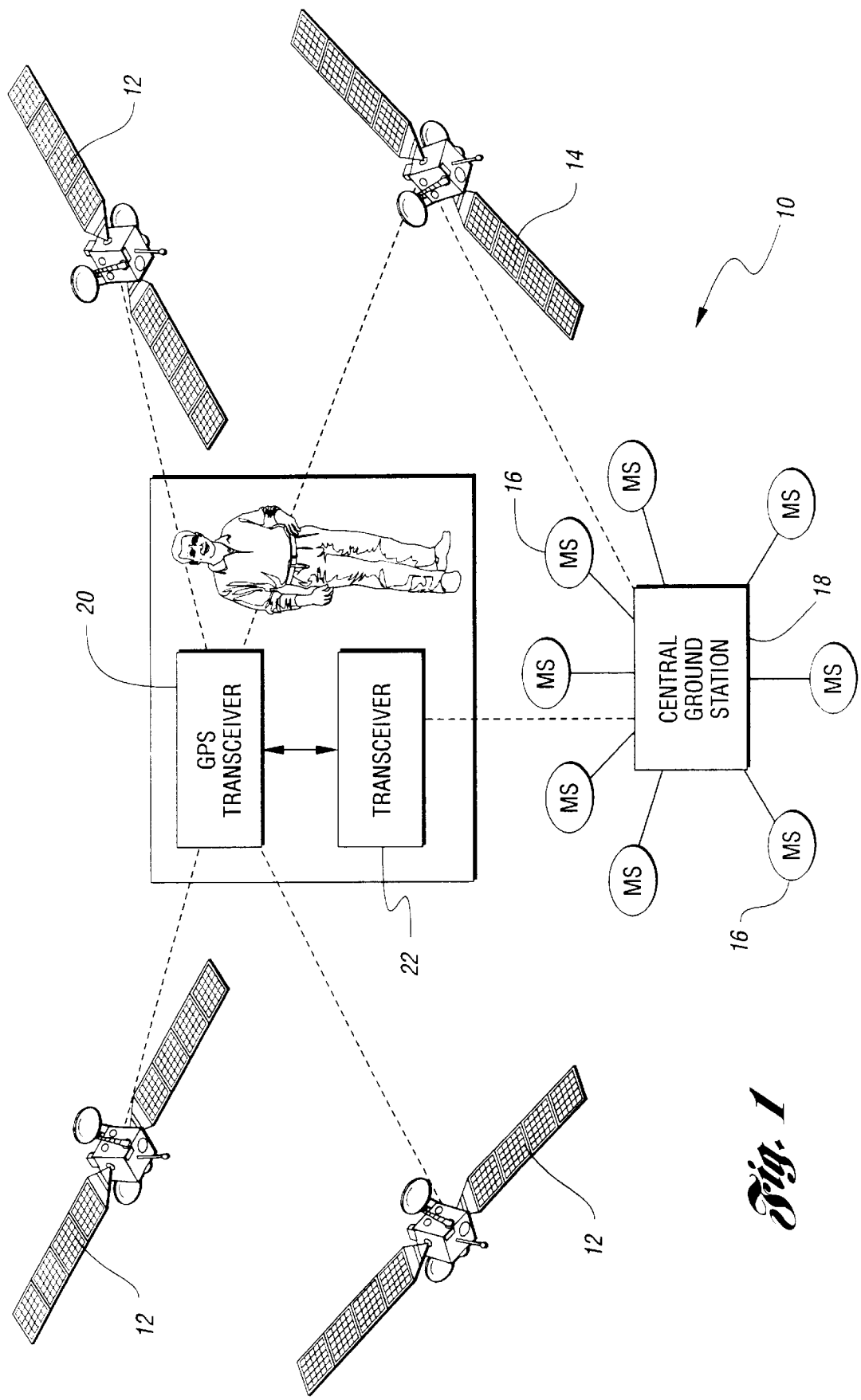
FIG. 1 is a schematic diagram of the system of the present invention.

Turning now to FIG. 1, there is illustrated a block diagram of the system of the present invention, denoted generally by reference numeral 10. The system 10 includes a plurality of Global Positioning System (GPS) Space Vehicles (SVs) 12 orbiting in space. The GPS SVs 12 broadcast pseudo-random navigation data messages to earth. The navigation data messages include three-dimensional position estimates of the SVs 12, clock correction information, and navigation data.

The system 10 also includes a plurality of monitor stations (MS) 16 disposed at known fixed locations throughout a predetermined area, such as the United States. Since the SPS of GPS SVs 12 induces a 100 meter ranging error, each of the monitor stations 16 monitor the navigation data messages broadcasted by the GPS SVs 12 and determine a correction factor based on the known location of the monitor station 16. That is, based on the navigation data messages broadcasted by the GPS SVs 12, the monitor station 16 determines its location and compares the determined location to the known location of the monitor station 16. Based on the comparison, each of the monitor stations 16 computes a correction factor.

Each of the monitor stations 16 are operatively coupled to a central ground station 18 for receiving the correction factors from each of the monitor stations 16. The central ground station 18 determines correction factors for each of the monitor stations 16 and points in between the monitor stations 16. The monitor stations 16 and the central ground station 18 are typical computer-based systems capable of receiving the pseudo-random signals of SPS and generating a position or location signal.

A user seeking to determine his/her location receives the navigation signals from the GPS SVs 12 via a GPS transceiver 20. A GPS navigation receiver, such as a Scout™ or Scout Master™ GPS receiver manufactured by Trimble, may be used. The GPS SVs 12 provide the user with signals which may be used to determine his general location within 100 meters without additional corrections. The GPS transceiver 20 generates a user data message including a three-dimensional position representing the general location of the user based on the navigation data messages broadcast by the GPS SVs 12. The user data message also includes information regarding which SVs 12 was used by the user, the user's time estimate and pseudo-range measurement data. In order to obtain more accurate information regarding the user's position, the user transmits the user data message to the central ground station 18 via a transceiver 22. The transceiver 22 may be either a wireline-based telephone system or a wireless telephone system, such as a cellular or satellite telephone system. In the case of a satellite telephone system, the system 10 includes a communication SV 14 for providing satellite communication. The transceiver 22 may also be a unique transceiver in which the GPS transceiver 20 and the transceiver 22 are combined into a single unit.

The central ground station 18 then determines location correction data to transmit to the user based on the user data message. Based on the navigation data message received from the GPS SVs 12 or the information in the user data message, either the central ground station 18 or the plurality of monitor stations 16 can also determine whether or not the messages broadcasted by the GPS SVs 12 to the user are good or bad, i.e., the integrity of the signal. This information can be determined and sent to the user as quickly as one second, since the information is transmitted directly to the user rather than to a geostationary satellite which ultimately broadcasts the information to the user. The central ground station 18 determines the location correction data in one of two ways: 1) utilizing the correction factor of a monitor station 16 located nearest the user; or 2) determining an intermediate correction factor based upon the correction factors of two or more monitor stations 16 if the user is located between two or more monitor stations. The central ground station 18 then transmits the user location correction data to the user via the transceiver 22. The user location correction data includes data regarding the integrity of the navigation signal and the correct location of the user.

The location correction data is then transmitted to the GPS transceiver 20 via the transceiver 22 which then determines the location of the user with sub-meter accuracy.

An accounting record may be created by the central ground station 18 so the user can be subsequently charged for receiving the more accurate position information. This accounting record can be created based on the communication link established by the user to the central ground station. The user is charged for this sub-meter accuracy based upon the amount of time the user was tied into the system 10 in the same way that a user is charged a fee for telephone services. The user may be charged by determining the total time the user is connected to the central ground station 18, or the user may be charged a per-transaction fee in which the total number of times the user connects himself to the central ground station 18 is determined.

Figure 2:
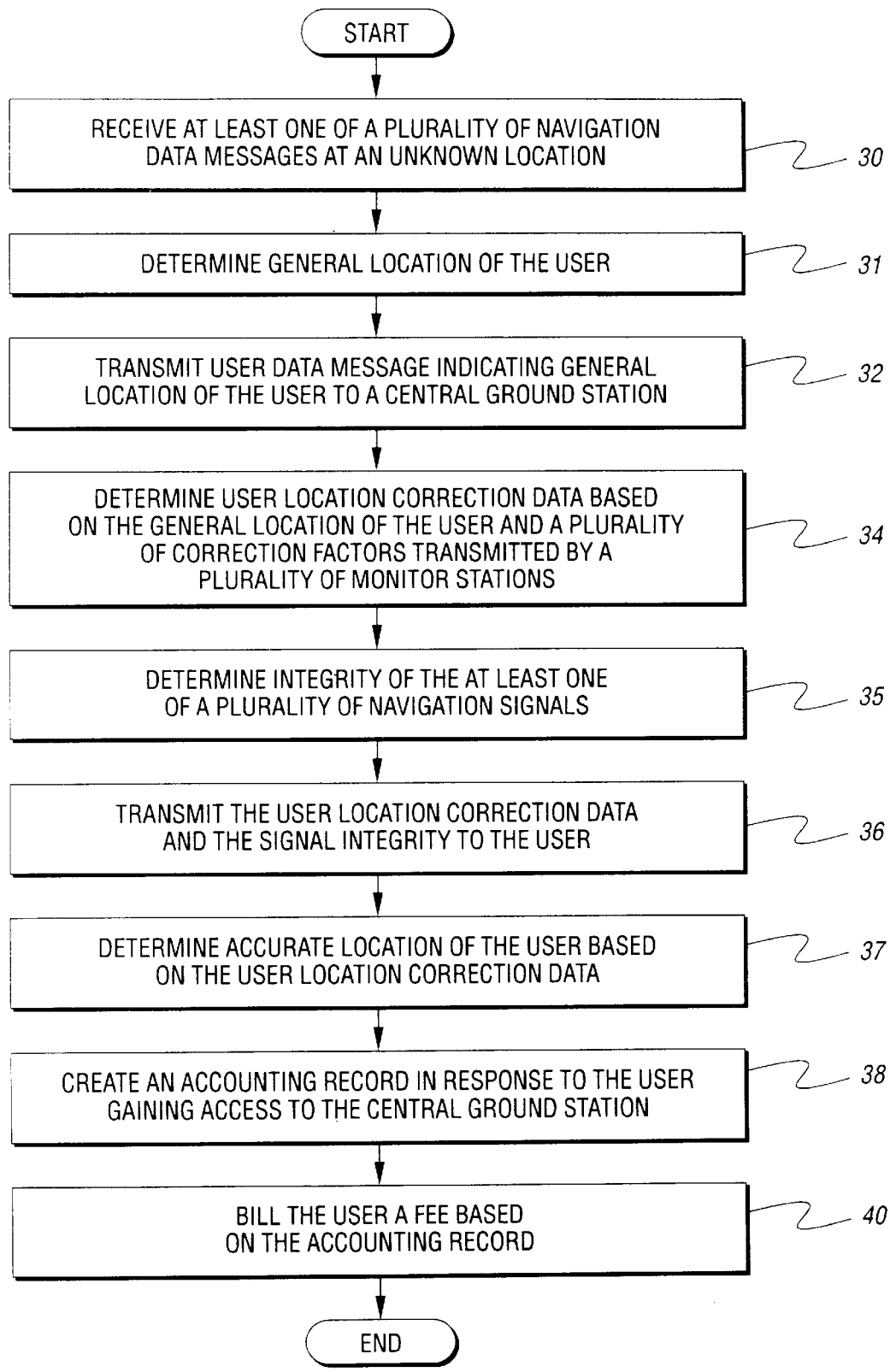
FIG. 2 is a block flow diagram illustrating the general sequence of steps associated with the operation of the present invention.

Turning now to FIG. 2, there is shown a flow diagram illustrating the sequence of steps associated with the method of the present invention. At least one of a plurality of navigation data messages are received by a user at an unknown location, as shown at block 30.

The GPS transceiver 20 then determines the general location of the user based on the at least one navigation data message, as shown at block 31, and generates a corresponding user data message. To obtain more accurate information, the user transmits the user data message to the central ground station 18, as shown at block 32.

The central ground station 18 then determines user location correction data based on the user data message and a plurality of correction factors transmitted by the plurality of monitor stations 16, as shown at block 34. Either the plurality of monitor stations 16 or the central ground station 18 may also determine integrity of the at least one navigation data message based on the known fixed location of the plurality of monitor stations 16 and the user data message, as shown at block 35.

Next, the central ground station 18 transmits user location correction data indicating the integrity of the navigation signal and the correct location of the user to the user as shown at block 36. Finally, the user is able to determine his location with sub-meter precision, as shown at block 37, based on the user location correction data.

An accounting record may be created for the user for receiving the user location correction factor from the central ground station 18, as shown at block 38. The accounting record is then utilized for billing the user for the services provided by the central ground station 18, as shown at block 40. The amount of the fee charged to the user is based on the amount of time that has elapsed between the transmission of any navigation data message to the central ground station 18 and the transmission of any navigation data to the user. The amount charged can also be determined based on a per-transaction basis as described above.

The present invention may also be used in conjunction with INMARSAT (International Maritime Satellite) and the FAA Wide Area Augmentation System programs. Potential commercial applications include airplanes that need to do "type 3" landings, surveyors, and other users who require high accuracy position and velocity type information.

While the best modes for carrying out the invention have been described in detail, those familiar with the art to which this invention relates will recognize various alternative designs and embodiments for practicing the invention as defined by the following claims.

What is claimed is:

1. For use with a plurality of Global Positioning System (GPS) Space Vehicles (SVs) for transmitting a plurality of navigation data messages, a plurality of monitor stations at a plurality of known fixed locations for monitoring the plurality of navigation data messages and transmitting a plurality of corresponding correction factors, and a central ground station for receiving the plurality of correction factors, a method for providing a user with correction information for use in accurately determining a location of the user, the method comprising the steps of:

receiving at least one of the plurality of navigation data messages at an unknown location;

determining a general location of the user based on the at least one of the plurality of navigation data messages and generating a user data message including data corresponding to the general location of the user;

transmitting the user data message to the central ground station;

determining user location correction data based on the user data message and the plurality of correction factors transmitted by each of the plurality of monitor stations; and transmitting the user location correction data to the user so as to provide the user with precision correction information.

2. The method as recited in claim 1 further comprising the step of determining integrity of the received at least one navigation data message and wherein the step of transmitting the user location correction data to the user includes the step of transmitting the integrity of the navigation signal to the user.

3. The method as recited in claim 2 wherein the step of determining the integrity is performed in a period of time not to exceed one second.

4. The method as recited in claim 1 further comprising the step of creating an accounting record for the user based on the transmission of the user data message to the central ground station.

5. The method as recited in claim 4 further comprising the step of billing the user a fee for receiving the user location correction data based on the accounting record.

6. The method as recited in claim 5 wherein the fee is based on an amount of time that has elapsed between the transmission of the at least one navigation data message to the central ground station and the transmission of the user location correction data to the user.

7. The method as recited in claim 1 wherein the step of transmitting the user location correction data includes the step of determining the location of the user.

8. The method as recited in claim 1 wherein the step of receiving the at least one navigation signal is performed utilizing a GPS navigation receiver.

9. The method as recited in claim 1 wherein the step of transmitting the user data message is performed utilizing wireline-based communication.

10. The method as recited in claim 1 wherein the step of transmitting the user data message is performed utilizing wireless communication.

11. The method as recited in claim 1 wherein the step of transmitting the user data message is performed utilizing satellite communication.

12. For use with a plurality of Global Positioning System (GPS) Space Vehicles (SVs) each transmitting a navigation data message, a system for providing a user with correction information for use in determining a location of the user, comprising:

a plurality of monitor stations disposed at a plurality of known fixed locations for monitoring the navigation data messages transmitted by each of the GPS SVs and for determining a plurality of corresponding correction factors;

a central ground station operatively coupled to each of the plurality of monitor stations for receiving the plurality of correction factors from each of the plurality of monitor stations;

a first transceiver for receiving at least one of the navigation data messages at an unknown location and determining a general location of the user and generating a corresponding user data message;

a second transceiver for receiving the user data message from the first transceiver and for transmitting the user data message to the central ground station; and wherein the central ground station determines user location correction data based on the received user data message and the plurality of correction factors transmitted by each of the plurality of monitor stations and transmits the user location correction data to the second transceiver, and wherein the second transceiver transmits the user location correction data to the first transceiver for use in determining the location of the user.

13. The system as recited in claim 12 wherein the central ground station further determines integrity of the navigation signal and transmits an indication of the integrity in the user location correction data to the second transceiver.

14. The system as recited in claim 13 wherein the central ground station determines the integrity in a period of time not to exceed one second.

15. The system as recited in claim 12 further comprising means for creating an accounting record indicating the use of the central ground station.

16. The system as recited in claim 15 wherein the accounting record is utilized to bill the user a fee for receiving the user location correction data.

17. The system as recited in claim 16 wherein the fee is based on an amount of time that has elapsed between the transmission of the user data message to the central ground station and the transmission of the user location correction data to the first transceiver.

18. The system as recited in claim 12 wherein the first transceiver determines the location of the user based on the user location correction data.

19. The system as recited in claim 12 wherein the first transceiver and the second transceiver are combined in a single unit.

20. The system as recited in claim 12 wherein the second transceiver is a wireline-based telephone.

21. The system as recited in claim 12 wherein the second transceiver is a wireless telephone.

22. The system as recited in claim 12 wherein the second transceiver is a satellite telephone.

23. The system as recited in claim 12 wherein the first transceiver is a GPS navigation receiver.

* * * * *